(12) United States Patent
Haenel et al.

(10) Patent No.: US 7,401,024 B2
(45) Date of Patent: Jul. 15, 2008

(54) AUTOMATIC AND USABILITY-OPTIMIZED AGGREGATION OF VOICE PORTLETS INTO A SPEECH PORTAL MENU

(75) Inventors: Walter Haenel, Holzgerlingen (DE); James R. Lewis, Delray Beach, FL (US); Dana L. Vizner, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 10/725,605

(22) Filed: Dec. 2, 2003

(65) Prior Publication Data

US 2005/0119878 A1   Jun. 2, 2005

(51) Int. Cl.
*G10L 21/00* (2006.01)
(52) U.S. Cl. ............... 704/275; 704/270.1; 704/270
(58) Field of Classification Search ............... 704/3, 704/9, 270, 1–10, 270.1, 275, 257; 715/744, 715/745
See application file for complete search history.

(56) References Cited

U.S. PATENT DOCUMENTS

2002/0111932 A1 * 8/2002 Roberge et al. ............... 707/1
2003/0018476 A1   1/2003 Yuen et al.
2003/0023440 A1   1/2003 Chu

FOREIGN PATENT DOCUMENTS

| AU | 2002252311 A8 | 9/2002 |
| EP | 1 164 576 A1 | 12/2001 |
| TW | 548997 B | 8/2003 |

* cited by examiner

*Primary Examiner*—Huyen X. Vo
(74) *Attorney, Agent, or Firm*—Richard A. Tomlin, Esq.; Steven M. Greenberg, Esq.; Carey Rodriguez Greenberg & Paul LLP

(57) ABSTRACT

A system and method is provided for optimizing the usability of a hierarchical menu in voice portal directory. A voice aggregator is programmed to rearrange the menu into a new hierarchical structure having a single layer. Portions of the hierarchy are partially restored if too many nodes, or duplicate nodes, are present at any selection step. Frequency of selection data are measured and applied to the nodes and used to order the nodes in the new hierarchy. Frequency of selection data are also used to determined which nodes are replaced in a hierarchy when it is partially restored.

8 Claims, 2 Drawing Sheets

AUTOMATIC AND USABILITY-OPTIMIZED AGGREGATION OF VOICE PORTLETS INTO A SPEECH PORTAL MENU

BACKGROUND OF THE INVENTION

1. Statement of the Technical Field

The present invention relates to the field of computer speech recognition and more particularly to a method and system for rearranging a voice portal directory menu by flattening the hierarchy of the menu while maintaining and optimizing the usability of the menu.

2. Description of the Related Art

When a user connects to a voice portal, the user is generally presented with a hierarchical menu structure, wherein the user must navigate through a tree of selections, before choosing a voice application, or portlet, as a final selection. Voice portals are often arranged to have directories with such hierarchical menus. To navigate through the menu, the user must listen to each choice for each selection in the menu, submit a response or input to the voice portal, and then proceed to the next, lower level of the hierarchy, where he or she may be presented with a new choice of menu options.

The time-sensitivity of voice portal menus dictates that the entire process of user-interaction with the voice portal be optimized so as to maximize the efficiency of such interaction. To reduce the costs of connecting a user to a voice portal over an extended period of time and to enhance the user experience, it is desirable to make the user's interaction with the voice portal as short as possible. A user must generally navigate through a number of selections before reaching a final choice. Also, if too many choices are presented to a user in one selection, the user may grow bored or may not wish to listen to the entire set of choices, or may become inattentive and thus miss the desired option. Therefore, it would be desirable to shorten the total time taken to reach a final selection. It would be further desirable to limit the number of choices in any one selection.

SUMMARY OF THE INVENTION

The present invention addresses the deficiencies of the art in respect to use of voice portals and provides a novel and non-obvious method, system and apparatus for usability-optimized aggregation of voice portlets into a speech portal menu.

Methods consistent with the present invention provide a method of rearranging a first hierarchical menu in a voice portal directory. The first hierarchical menu includes one or more layers and a plurality of nodes. The plurality of nodes includes one or more non-terminal nodes, each having one or more lower nodes, and a first number of terminal nodes. A second hierarchical menu is generated having only a first layer, the first layer having an initial set of nodes identical to the first number of terminal nodes. A predetermined limit is then read. The first number is compared with the predetermined limit. If the first number exceeds the predetermined limit, a first set of nodes in the first layer is replaced with a first replacement non-terminal node and the first set of nodes are connected as terminal nodes to the first replacement non-terminal node. The first replacement non-terminal node is the one of the non-terminal nodes in the first hierarchical menu which has terminal nodes identical to the first set of nodes.

Methods consistent with the present invention provide another method of rearranging a first hierarchical menu in a voice portal directory. The first hierarchical menu includes one or more layers and a plurality of nodes. The plurality of nodes includes one or more non-terminal nodes, each having one or more lower nodes, and a first number of terminal nodes. A second hierarchical menu is generated having only a first layer. The first layer has an initial set of nodes identical to the first number of terminal nodes. Each of the initial set of nodes is compared with all other nodes in the initial set. If two or more of the nodes in the initial set are identical, a first set of nodes in the first layer is replaced with a first replacement non-terminal node and the first set of nodes is connected as terminal nodes to the first replacement non-terminal node. The first replacement non-terminal node is the one of the non-terminal nodes in the first hierarchical menu which has terminal nodes identical to the first set of nodes.

Systems consistent with the present invention include a system for rearranging a first hierarchical menu in a voice portal, the first hierarchical menu having one or more layers and a plurality of nodes. The plurality of nodes includes one or more non-terminal nodes, each having one or more lower nodes, and a first number of terminal nodes. The system includes a voice aggregator configured for coupling to the voice portal to rearrange the first hierarchical menu. The voice aggregator is programmed to generate a second hierarchical menu having only a first layer. The first layer has an initial set of nodes identical to the first number of terminal nodes. The voice aggregator is also programmed to read a predetermined limit and compare the first number with the predetermined limit, and is programmed to replace, if the first number exceeds the predetermined limit, a first set of nodes in the first layer with a first replacement non-terminal node and to connect the first set of nodes as terminal nodes to the first replacement non-terminal node. The first replacement non-terminal node is the one of the non-terminal nodes in the first hierarchical menu having terminal nodes identical to the first set of nodes.

Systems consistent with the present invention also include a system for rearranging a first hierarchical menu in a voice portal, the first hierarchical menu having one or more layers and a plurality of nodes. The plurality of nodes includes one or more non-terminal nodes, each having one or more lower nodes, and a first number of terminal nodes. The system includes a voice aggregator configured for coupling to the voice portal to rearrange the first hierarchical menu. The voice aggregator is programmed to rearrange the first hierarchical menu. The voice aggregator is also programmed to generate a second hierarchical menu having only a first layer. The first layer has an initial set of nodes identical to the first number of terminal nodes. The voice aggregator is programmed to compare each of the initial set of nodes with all other nodes in the initial set, and is also programmed to replace, if two or more of the nodes in the initial set are identical, a first set of nodes in the first layer with a first replacement non-terminal node and to connect the first set of nodes as terminal nodes to the first replacement non-terminal node. The first replacement non-terminal node is the one of the non-terminal nodes in the first hierarchical menu having terminal nodes identical to the first set of nodes.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

As used herein, a "hierarchical menu" means a tree-like structure composed of a number of interconnected nodes, arranged in a hierarchical fashion, such that each node is connected to another node that is either higher or lower in the hierarchy, but not at the same level. In this sense, a node can be either: (i) a "non-terminal node", or (ii) a "terminal node". An terminal node is defined as a node that has no other nodes connected to it that are lower in the hierarchy. A non-terminal node is defined as a node that is not a terminal node. Furthermore, as used herein, a "lower node" of some other node may be any node, either a terminal node or a non-terminal node, which is lower in the hierarchy relative to said other node. As used herein, a set of nodes is any aggregation or grouping of one or more nodes.

Therefore, the "hierarchical menu" can generally be made up of a number of "layers", which, as used herein, are sets of nodes that are all the same number of steps lower in the hierarchy from the node (or layer) in the hierarchy which has no other nodes higher in the hierarchy. Within each layer there may also be a number of groups of nodes that might be presented at once for any given "selection step," where a user is prompted to select from a set of nodes to proceed through the hierarchical menu from one layer to a lower layer.

Figure 1:
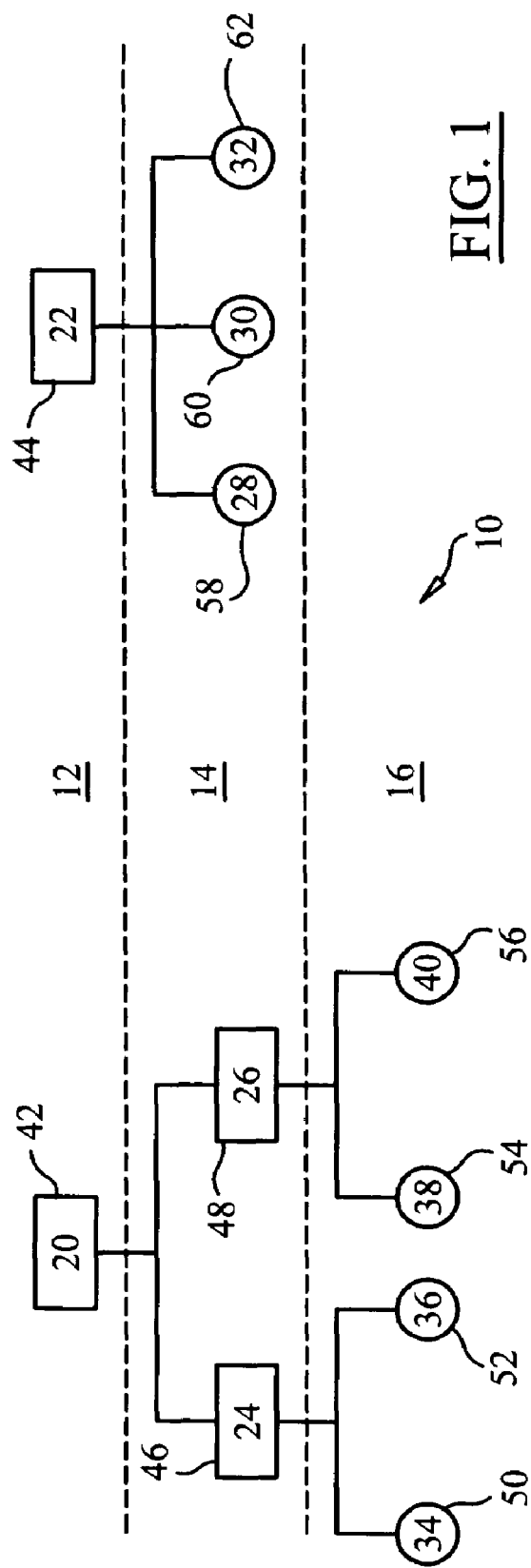
FIG. 1 is an illustration of one example of a hierarchical menu structure.

FIG. 1 is all illustration of a hierarchical menu 10 having a number of layers 12, 14, and 16, and nodes 20, 22, 24, 26, 28, 30, 32, 34, 36, 38, and 40, of which some are non-terminal nodes 42, 44, 46, and 48, and some are terminal nodes 50, 52, 54, 56, 58, 60, and 62. As such terminal nodes 58, 60, and 62 are lower nodes of category node 44. And category nodes 46 and 48 are lower nodes of category node 42.

Thus, if a user were to navigate through menu 10, after selecting node 20, he or she would be presented with the "selection step" of nodes 24 and 26. If the user had initially selected node 22, he or she would be presented with the selection step of nodes 58, 60, and 62. Note that each group of selection step nodes is in the same layer 14.

The present invention is a method, system and apparatus for usability-optimized aggregation of voice portlets into a speech or voice portal menu. The voice portal serves as a connection to a user and presents the user with an array of selections, which are organized and arranged as a hierarchical menu structure defined hereinabove. The voice portal menu can be created and arranged by a voice aggregator application resident on the voice portal.

Figure 2:
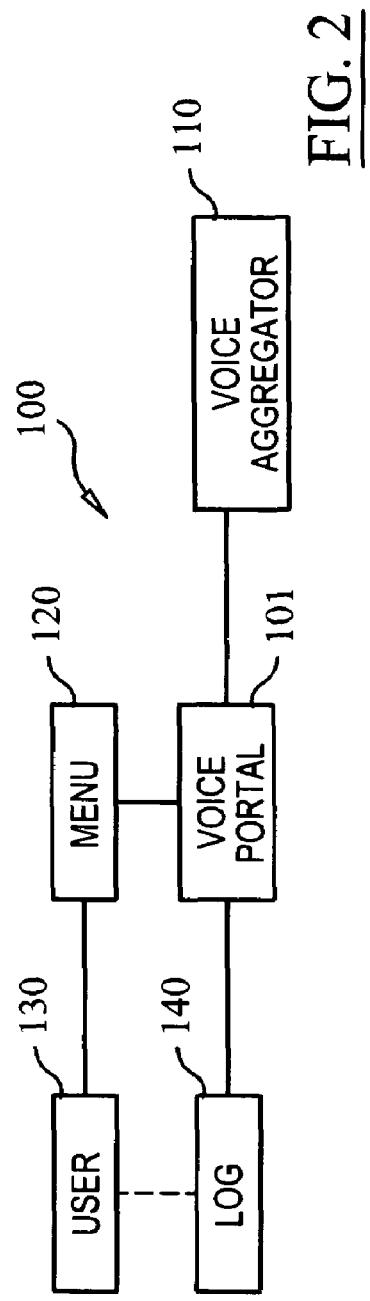
FIG. 2 is an illustration of one embodiment of a voice portal system to which the present invention may be applied.

FIG. 2 depicts a voice portal system 100. The voice portal system 100 can include a voice portal 101, a voice aggregator 110, a menu 120 which a user 130 accesses to navigate through the portal 101, and a log 140. The voice portal 101 can be a general server or other piece of hardware as is well known in the art. The voice aggregator application 110 can manage operations on the voice portal 101. The menu 120 is the front end of the voice portal 101 with which the user 130, which often is a caller on a telephone network, interacts to navigate through the various voice applications, or portlets, resident in the portal 101.

The menu 120 can be initialized or programmed by an administrator to provide an initial directory of choices for the user 130, through which the user 130 can navigate by selecting from a range of options presented by each level of the menu. This menu 120 can be initially arranged to resemble a hierarchical menu. Using the hierarchical menu 10 in FIG. 1 as an example, a user first can be presented with the choices in layer 12, which are nodes 20 and 22, also labeled as non-terminal nodes 42 and 44. However, only the terminal nodes 50 through 62 in the menu 10 have separate voice applications, or portlets, that serve as the final selection for the user. To reach one of such terminal nodes, the user must first select one or more non-terminal nodes, such nodes 24 and 26, before reaching a terminal node. The entire process can involve multiple steps, and multiple selections.

To reduce the time required to make such multiple selections, the present invention provides a method and system for rearranging the menu 10, such that the usability of the voice portal is optimized. The first way in which the menu is optimized is to "flatten" the hierarchy of the menu. Rather than arranging a menu such as menu 10 in multiple layers 12, 14, and 16, the present invention rearranges the menu 10 to includes nodes in as small a number of layers as is practicable. As the number of times a user is prompted to make a selection decreases, the overall interaction with the voice portal becomes faster, and the menu itself becomes more efficient and optimized. The present invention starts the process of flattening a hierarchy by taking all terminal nodes in a menu and rearranging them into a single layer, second menu. The user is then immediately presented with a new menu which only has the final choices in the directory. The need to navigate through a range of non-terminal nodes before arriving at the final selection is eliminated.

In addition to flattening the hierarchy of the menu, to further optimize usability, the invention provides for a new menu 120 to be arranged such that a user is presented with menu options that more quickly satisfy a user's desired final choice. Instead of navigating through an excessive number of selections or non-terminal nodes in the menu, the user is presented with a menu that has the minimum number of nodes necessary to present the user with a menu option that a user would tend to choose.

The present invention therefore estimates which menu options a user would tend to choose, before arranging those menu options in a new menu for the user. To make such an estimate, the present invention adds a log 140 to the voice portal 101, which measures and records all the selections a user 130 makes in the initial menu 120. The log records the number of times each node is selected in the menu 120, and stores such data in a memory in the voice portal 101. Therefore, the log 140 is a measure of the frequency of use of each node in a menu 120.

As used herein, the term "frequency of use" shall refer to a metric of either: (i) the absolute number of times a node is selected, or, (ii) the relative number of times a node is selected, with respect to a group of one or more nodes. The frequency of use could be measured for each node with respect to each user. Or it could measure the aggregate of all selections made by all users for each node. The frequency of use data may only be recorded for user calls into the voice portal that terminate in an actual selection of a voice portlet or terminal node in the menu, which is the default setting, or may be adjusted to include incomplete calls, depending on the desired feature.

The present invention therefore utilizes such frequency of use data to reorganize the menu 120, which may be arranged like menu 10, to determine which nodes in the menu are statistically selected more often by a user. The voice aggregator 110 will then crawl through the entire initial menu 120, read all the nodes in the menu, and rearrange the nodes in a new menu, taking into account the frequency of use data for each node.

As an example, a voice portal 101 may have eight voice-enabled portlets arranged in the menu of Table 1, which also shows the relative frequency of use for each of the terminal nodes in the menu.

TABLE 1

| Path to Terminal Node | Frequency of Use of Terminal Node |
|---|---|
| Notes: Mail | 2nd Highest |
| Notes: Calendar | 3rd Highest |
| Notes: Address Book | 4th Highest |
| Notes: Todo List | 5th Highest |
| Entertainment: News: National News | 7th Highest |
| Entertainment: News: Sports News | Highest |
| Entertainment: Weather | 6th Highest |
| Entertainment: Horoscope | Lowest |

In Table 1, prior to optimization under the method and system of the present invention, a user connecting to the voice portal would initially be presented with two non-terminal nodes: "Notes" or "Entertainment." If the user selected "Notes," the next choice would be between the four terminal nodes of: "Mail," "Calendar," "Address Book," and "Todo List." If the user has instead selected "Entertainment," the next choice would be between single non-terminal node "News" and two terminal nodes "Weather" and "Horoscope." If the user selected "News" he or she would then be prompted with a new choice between "Sports News" and "National News."

Starting with the first hierarchical menu in Table 1, the present invention begins the usability optimization of the menu by having the voice aggregator 110 generate a new, second hierarchical menu from the first menu 120, having only a single layer, such that a user 130, when connecting to the portal 101, is immediately presented with a new, single choice for selection: "Mail, Calendar, Address Book, Todo List, National News, Sports News, Weather, and Horoscope." All of the selections presented to the user in this second, single layer menu are the terminal nodes from the initial menu.

The present invention further optimizes the usability by rearranging all of the nodes in the second menu according to the frequency of use of each of the terminal nodes from the first menu listed in the second menu. Using the example of Table 1, the second menu, optimized with frequency of use data, would be: "Sports News, Mail, Calendar, Address Book, Todo List, Weather, National News, and Horoscope." Thus, this second menu would tend to present a user with a range of choices that more quickly presents a choice a user is more statistically likely to select. If the voice system is full-duplex and therefore barge-in enabled, the user can select Sports News as soon as the second menu starts playing and does not need to listen to the rest of the selections that he or she might not otherwise have a predilection to select.

However, one problem with aggregating nodes in a single selection step is that too many nodes, will be presented for any given selection step. The user could possibly become bored or frustrated in his or her efforts to interact with the portal, and may hang up, or the user may become inattentive and thus miss the desired option. To prevent this problem, the present invention provides a method and system for checking a flattened hierarchical menu to see if too many nodes are presented in a selection step, and restores a portion of the flattened hierarchy to prevent too many nodes from appearing in any one selection.

Table 2 presents another example of a first, initial hierarchical menu which may be optimized according to the principles of the present invention.

TABLE 2

| Path to Terminal Node | Frequency of Use of Terminal Node |
|---|---|
| Personal: News: Sports News | Highest |
| Personal: News: Weather | 6th Highest |
| Personal: News: National News | 7th Highest |
| Personal: Entertainment: Horoscope | 8th Highest |
| Personal: Entertainment: TV Listings | 9th Highest |
| Business: Notes: Mail | 2nd Highest |
| Business: Notes: Calendar | 3rd Highest |
| Business: Notes: Address Book | 4th Highest |
| Business: Notes: Todo List | 5th Highest |
| Business: Reminder List | 13th Highest |
| Business: Press Releases | Lowest |
| Current Conditions: Traffic | 10th Highest |
| Current Conditions: Weather | 11th Highest |
| Current Conditions: Stocks | 12th Highest |

The initial menu in Table 2 has 14 total terminal nodes. If the maximum value of the number of nodes allowable in a selection were 12, a single layer second menu having all the terminal nodes would contain too many nodes. Therefore, the second menu could not be completely flat. The present invention therefore provides a process for restoring a portion of the hierarchy in the first menu back into the flattened second menu, so as to meet the maximum node restriction.

Furthermore, it will be noted that two nodes have identical values, or texts that are presented to the user: (A) Personal: News: Weather, and (B) Current Conditions: Weather. These two nodes are therefore "duplicate nodes," which, if presented in a single selection step for a menu, would cause confusion for the user. The present invention therefore also provides a method and system for restoring a portion of the hierarchy in the first menu back into the flattened second menu, so as to prevent the appearance of duplicate nodes in any one selection step.

Figure 3:
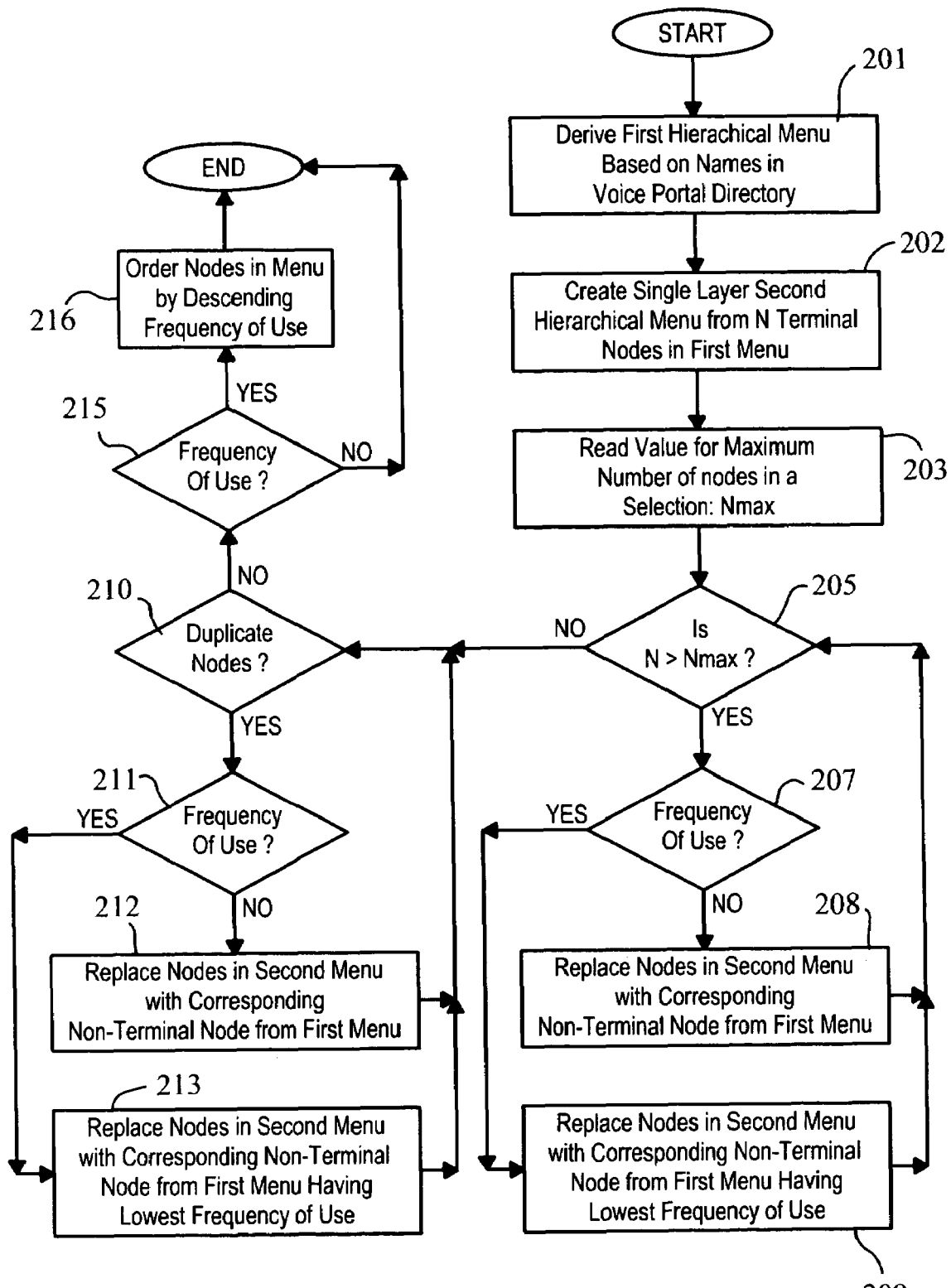
FIG. 3 is a flowchart of the process by which the present invention rearranges a hierarchical menu structure.

FIG. 3 is a flowchart of the process by which the present invention rearranges a hierarchical menu structure. The process begins at step 201 where the voice aggregator derives the first hierarchical menu based on the names or values of the nodes in the voice portal directory. This could be a first hierarchical menu such as that presented in Table 2. Next, the voice aggregator creates a single layer second hierarchical menu in step 202. The second hierarchical menu has the N terminal nodes, where N is an integer greater than zero, that are included in the first initial hierarchical menu set up in the voice portal.

The process next reads in step 203 a predetermined value for the maximum number of nodes allowable in any given selection step. The maximum value Nmax is the limit for the number of nodes in any layer of the new second hierarchical menu. In step 205, the process reads the number of nodes in the single layer of the second hierarchical menu and compares that number with Nmax. If Nmax is exceeded, the process goes to step 207, to check for whether frequency of use data is available for the nodes. If no frequency of use data is available, the process goes to default step 208.

In step 208, the process selects a group of terminal nodes in the single layer of the second hierarchical menu and replaces those nodes with the corresponding non-terminal node from the first hierarchical menu which had the replaced terminal nodes attached to it. Taking the menu of Table 2 as an example, if the process were to proceed to step 208, the resulting first layer of the second hierarchical menu would be: "Sports News, Weather, National News, Horoscope, TV Listings, Mail, Calendar, Address Book, Todo List, Reminder List, Press Releases, Current Conditions." All the selections in such a second menu are terminal nodes save for the "Current Conditions" selection. If a user selected "Current Conditions," he or she would then be prompted with the choices of "Traffic, Weather, Stocks." The particular grouping of terminal nodes may be chosen by a default condition such as the last or "right-most" corresponding non-terminal node from the initial first menu. This has the advantage of relying on the initial arrangement of the first menu, which may have been done according to some set of usability criteria by the creator (such as a system administrator) of the first menu.

After step 208 the process returns to step 205 where the maximum node restriction is again tested against the number of nodes in the first layer of the second hierarchical menu. In the above example, if the predetermined maximum Nmax were 12, the menu rearranged from the menu in Table 2 would be finished, and the process would proceed to step 210.

But first, if, after step 207, the voice portal had been enabled with frequency of use data, the process would proceed to step 209, where the same hierarchy restoration process as in step 208 would be executed, except that the nodes replaced would be those nodes having a corresponding non-terminal node having the lowest frequency of use. The lowest frequency of use may be measured in multiple ways. First, the metric could be determined by comparing the average frequency of use of the group of lower nodes connected to a non-terminal node. Second, the actual frequency of use of the non-terminal node itself could be the deciding metric. In either case, the group of nodes having such lowest of frequency of use would be replaced in the single layer of the second menu with their corresponding non-terminal node from the first menu. In the menu of Table 2, this would be "Traffic, Weather, Stocks" nodes attached to the non-terminal node "Current Conditions."

As shown in FIG. 3, the process can repeat itself from step 205 through steps 208 or 209, until the second hierarchical menu is optimized according to the maximum node restriction for any given layer. The process could continue into additional layers lower in the hierarchy after the first single layer of the second menu, such that no selection step, or grouping of nodes presented to the user, contained too many nodes in the selection step. If the predetermined limit Nmax is too low, such that the process fully restores the second menu back to the first menu, a stopping condition could be programmed into the voice aggregator to arrest the process after a certain number of restoration steps 205 through 208/209.

Once the maximum number of nodes criterion is satisfied in the arrangement of the second hierarchical menu, the process proceeds to step 210, where the voice aggregator checks to see if any one node in a layer, or grouping of nodes in a selection step, is identical to another. It therefore checks for duplicate nodes. If there are duplicate nodes, the process first checks for frequency of use data in step 211. Depending on the result, the process then proceeds with steps 212 and 213, which are identical to steps 208 and 209, respectively. However, in step 213, instead of replacing only the group of nodes with the lowest frequency of use, the process can select the group which has the lowest frequency and which also will result in the elimination of duplicate nodes in any layer or selection step of the second menu. After steps 212 and 213, the process returns to step 210 and repeats steps 210 through 212/213 to remove all duplicate nodes in any layer or selection step of the second menu.

After the maximum number of nodes criterion and duplicate node criterion are satisfied, the process goes on to step 215, making a final check for frequency of use data. If frequency of use is available, the nodes in all layers and selection steps are ordered by descending frequency of use in step 216. Otherwise, the process terminates, and the voice aggregator completes the rearrangement of the voice portal menu into a new usability optimized menu.

It will be appreciated that the present system and method may be applied to both visual and auditory systems, where any hierarchical menu structures are used. In addition to voice portals, the present invention may be applied of visual and graphical systems where a user is prompted to navigate through a visual representation of a hierarchical structure.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of rearranging a first hierarchical menu in a voice portal directory, the first hierarchical menu having one or more layers and a plurality of nodes, the plurality of nodes including one or more non-terminal nodes, each having one or more lower nodes, and a first number of terminal nodes, said method comprising the steps of:
   generating a second hierarchical menu having only a first layer, the first layer having an initial set of nodes identical to the first number of terminal nodes;
   reading a predetermined limit: comparing the first number with the predetermined limit;
   replacing, if the first number exceeds the predetermined limit, a first set of nodes in the first layer with a first replacement non-terminal node and connecting the first set of nodes as terminal nodes to the first replacement non-terminal node, the first replacement non-terminal node being the one of the non-terminal nodes in the first hierarchical menu having terminal nodes identical to the first set of nodes.

2. The method of claim 1, further comprising:

reading a frequency of use for each node in the first hierarchical menu; and arranging the nodes in the first layer in order of descending frequency of use.

3. The method of claim 2, further comprising: wherein the first replacement non-terminal node has the lowest frequency of use of all the non-terminal nodes in the first hierarchical menu.

4. The method of claim 2, further comprising:

computing an average frequency of use for each of non-terminal node in the first hierarchical menu, each average frequency of use being equal to the average of the frequency of use for all of the lower nodes connected to said each non-terminal node;

wherein the first replacement non-terminal node has the lowest average frequency of use of all the non-terminal nodes in the first hierarchical menu.

5. The method of claim 1, further comprising:

reading a number of nodes in the first layer;

replacing a sequence of one or more successive sets of nodes in the first layer with a sequence of corresponding replacement non-terminal nodes and connecting each of the successive sets of nodes, along with any of its lower nodes, to the replacement non-terminal node corresponding to each successive set until the number of nodes in the first layer does not exceed the predetermined limit, each of the corresponding replacement non-terminal nodes being selected from the non-terminal nodes in the first hierarchical menu having lower nodes identical to the one of the one or more successive set of nodes to which the corresponding replacement non-terminal node corresponds.

6. The method of claim 5, further comprising:

reading a frequency of use for each node in the first hierarchical menu; and arranging the nodes in the first layer in an order of descending frequency of use.

7. The method of claim 6, wherein the sequence of corresponding replacement non-terminal nodes is sequenced in order of ascending frequency of use.

8. The method of claim 6, further comprising:

computing an average frequency of use for each of the non-terminal nodes in the first hierarchical menu, each average frequency of use being equal to the average of the frequency of use for all of the lower nodes connected to said each non-terminal node;

wherein the sequence of corresponding replacement non-terminal nodes is sequenced in order of ascending average frequency of use.

* * * * *